United States Patent [19]

Michael et al.

[11] 4,339,803

[45] Jul. 13, 1982

[54] VIDEO FRAME STORE AND REAL TIME PROCESSING SYSTEM

[75] Inventors: Peter C. Michael, Newbury; Richard J. Taylor, London; Martin R. Trump, Newbury, all of England

[73] Assignee: Micro Consultants Limited, Berkshire, England

[21] Appl. No.: 176,226

[22] Filed: Aug. 6, 1980

Related U.S. Application Data

[63] Continuation of Ser. No. 15,678, Feb. 27, 1979, abandoned, which is a continuation-in-part of Ser. No. 841,519, Oct. 12, 1977, Pat. No. 4,163,249.

[30] Foreign Application Priority Data

| Oct. 14, 1976 [GB] | United Kingdom | 42751/76 |
| Jul., 1977 [GB] | United Kingdom | 31355/77 |
| Jul., 1977 [GB] | United Kingdom | 31356/77 |
| Jul., 1977 [GB] | United Kingdom | 31357/77 |

[51] Int. Cl.³ .............................................. H04N 5/21
[52] U.S. Cl. ................................. 364/724; 358/167; 364/734
[58] Field of Search ................ 364/724, 734, 723; 358/36, 167; 343/5 VQ

[56] References Cited

U.S. PATENT DOCUMENTS

| 4,031,364 | 6/1977 | Wilmot | 358/167 X |
| 4,040,052 | 8/1977 | Stanislaw | 364/724 |
| 4,044,381 | 8/1977 | Shimano et al. | 358/167 X |
| 4,064,530 | 12/1977 | Kaiser et al. | 358/36 |

*Primary Examiner*—David H. Malzahn
*Attorney, Agent, or Firm*—Dowell & Dowell

[57] ABSTRACT

A distributed video frame store and real time processing system which includes a frame store subdivided into a number of sectors each with an associated arithmetic unit capable of parallel operation for processing data from all the sectors simultaneously. Each arithmetic unit which comprises a subtractor, multiplier and adder may be shared as a common input and output processor during write and store read cycles respectively for that sector. During a write cycle, the incoming data together is processed with previously stored data and then written into the store sector, the coefficient for the multiplier being selected in dependence on any difference measured in the subtractor. During a read cycle and stored information can be passed via the arithmetic unit to the output. During the read cycle, data from two locations within that store sector is processed, and in dependence on any movement previously detected, these locations can be from the same or alternate fields.

22 Claims, 19 Drawing Figures

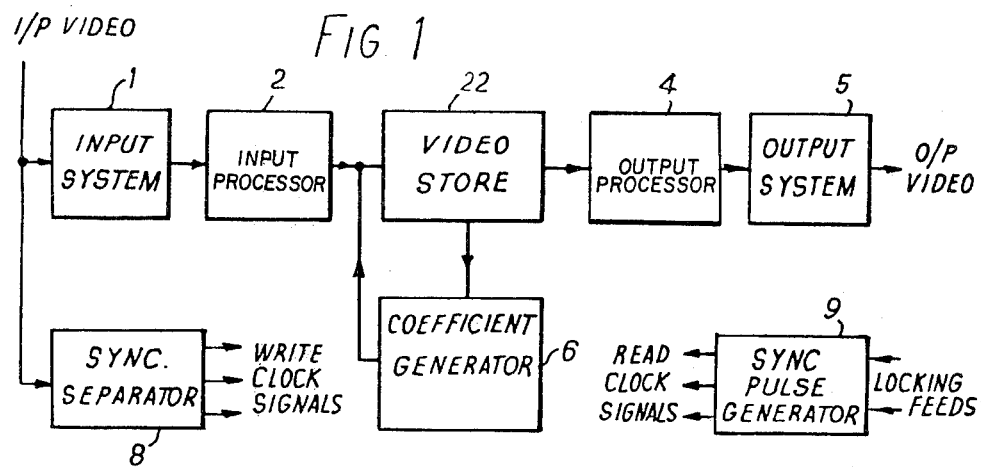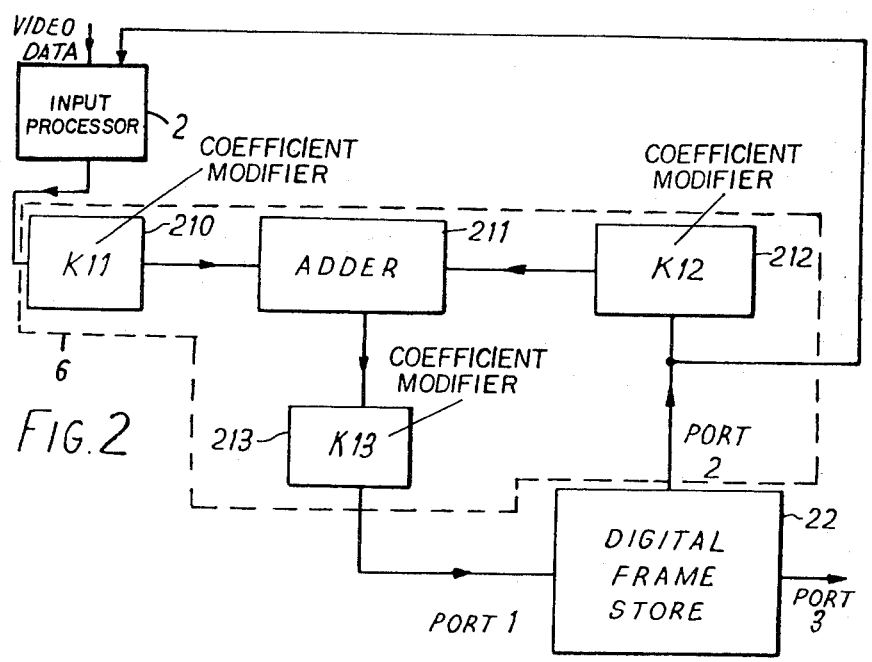

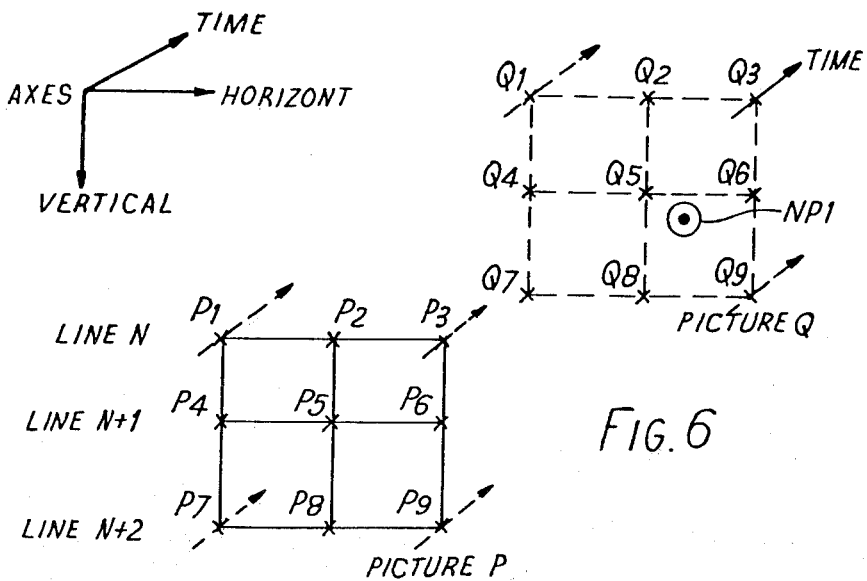
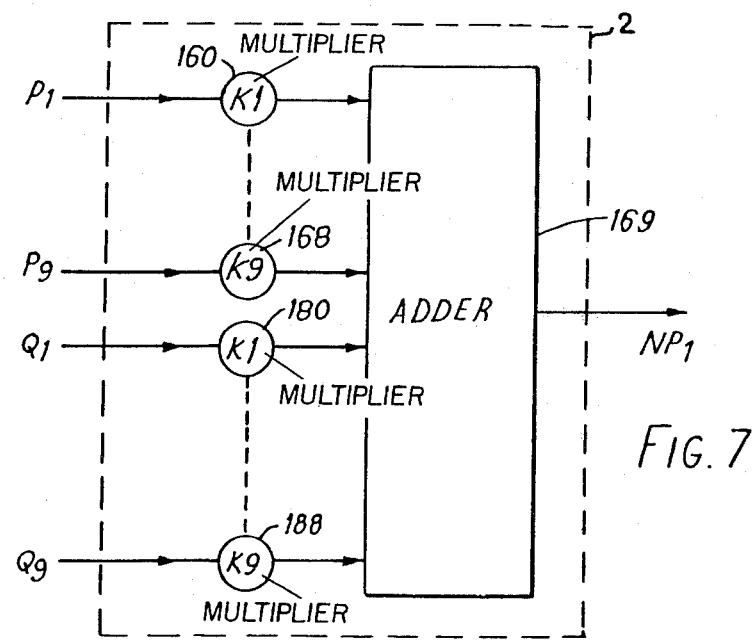
FIG. 6
FIG. 7

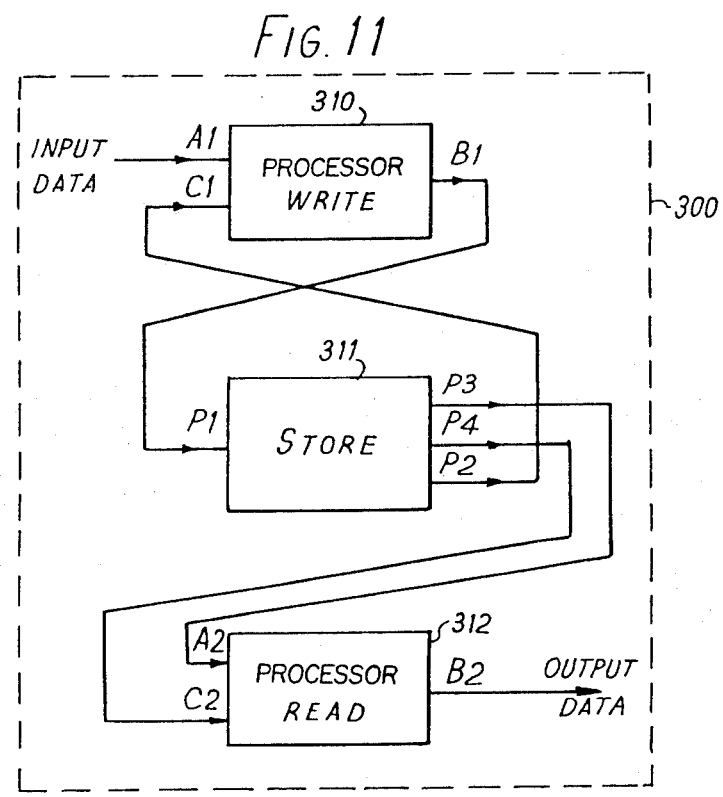

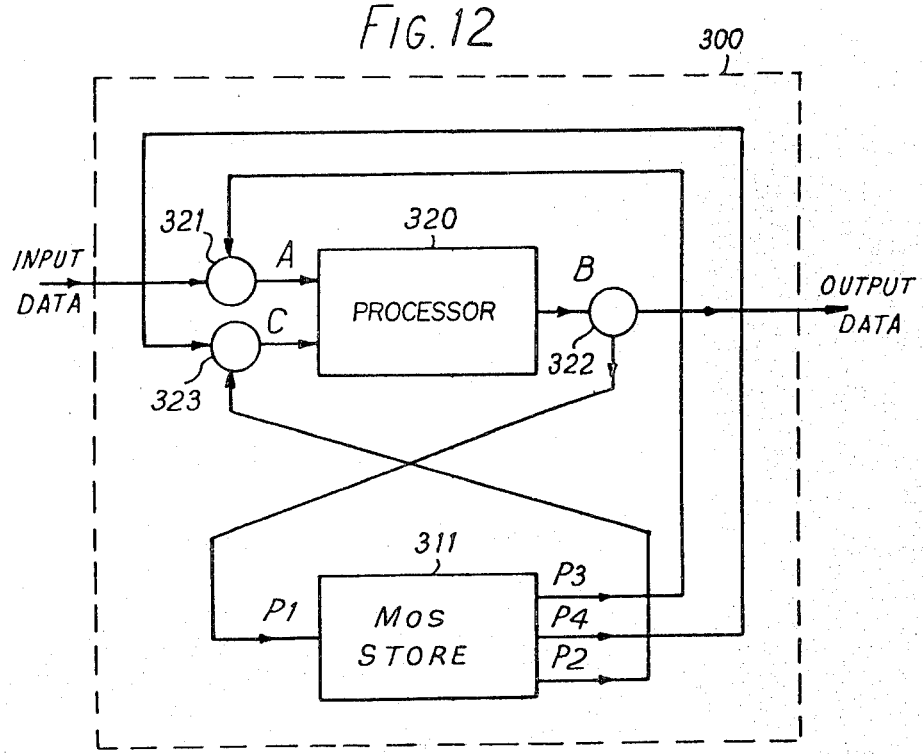
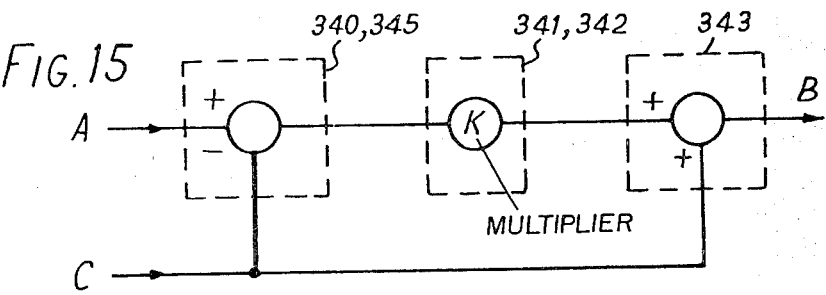

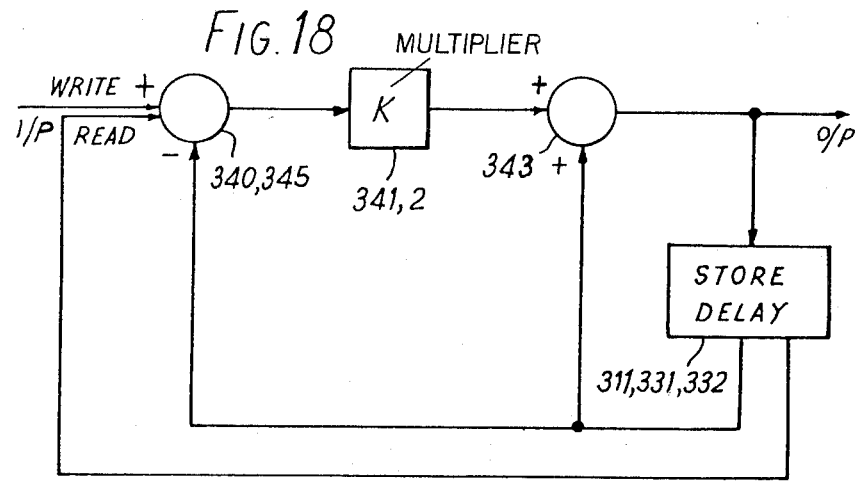
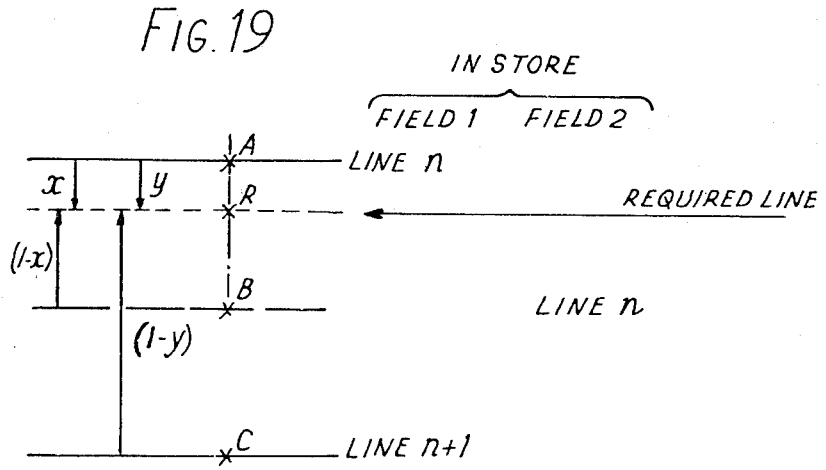

VIDEO FRAME STORE AND REAL TIME PROCESSING SYSTEM

This is a continuation, of application Ser. No. 015,678, filed Feb. 27, 1979 now abandoned which is a continuation-in-part application to Ser. No. 841,519 filed Oct. 12, 1977 now U.S. Pat. No. 4,163,249.

BACKGROUND OF THE INVENTION

The invention relates to a distributed frame store and real time processing system for use in video manipulation.

SUMMARY OF THE INVENTION

According to the invention there is provided a distributed video frame store and real time processing system comprising a video frame store subdivided into a plurality of sectors capable of parallel operation; and input processing means comprising a plurality of arithmetic units capable of parallel operation for processing incoming data in dependence on data from each sector of the store simultaneously.

Further according to the invention there is provided a method of processing video data in real time comprising storing a frame of video data subdivided into a number of sectors, and arithmetically processing each sector of stored and incoming data simultaneously.

BRIEF DESCRIPTION OF THE DRAWINGS

The invention will now be described by way of example with reference to the accompanying drawings in which:

FIG. 1 shows a video processing system using a store,

FIG. 2 shows one arrangement for the input processor,

FIG. 6 shows picture synthesis using volume manipulation,

FIG 7 shows an arrangement for effecting this synthesis,

FIG. 11 shows the basic process implemented within the distributed system,

FIG. 12 shows the minimum arrangement for the processing system,

FIG. 15 shows the general processor function of FIG. 14,

FIG. 18 shows the processing functions of FIG. 16, and

FIG. 19 shows the picture synthesis processing for a read operation of the system.

DESCRIPTION OF PREFERRED EMBODIMENTS

Figure 3:
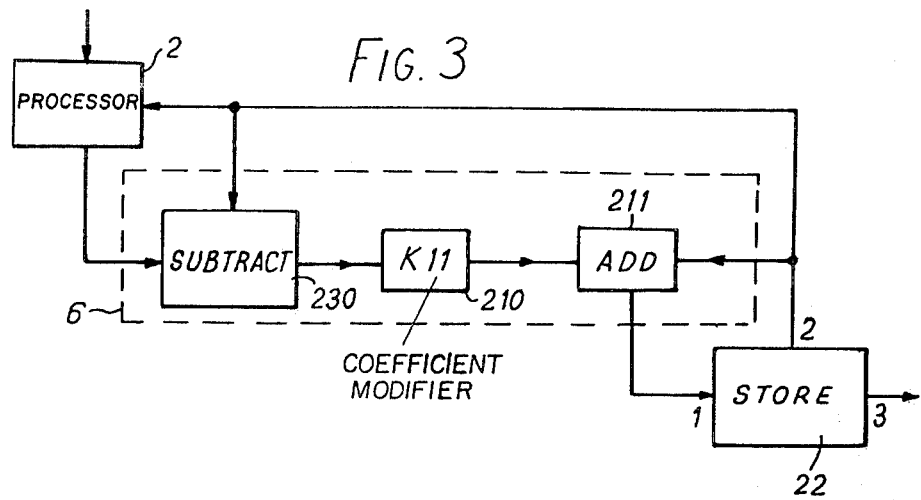
FIG. 3 shows an alternative system using a single coefficient.

FIG. 1 shows a processing system as disclosed in U.S. Pat. No. 4,163,249 for manipulation of video information.

Input system 1 turns the standard analogue television signal into digital form. Input processor 2 manipulates the input data. The data is stored in the video store 22. An output processor 4 which may be similar to input process 2 undertakes manipulation of the output data. An output system 5 converts the digital format to a standard television analogue format. A coefficient generator system 6 (e.g. for noise reduction) is implemented by utilising an additional port from the video store and adjusting coefficients to determine the proportion of input video which is to be stored. For the sake of completeness a sync separator 8 and sync pulse generator 9 are included although the function of these to provide timing signals in video systems is well known from earlier patents so will not be described in detail. The sync separator 8 provides the separation of the sync pulses which form part of the television signal and is capable of deriving the clock pulses needed to drive the store and the processor circuits. The sync pulse generator 9 is locked to a standard set of feed signals normally comprising sync pulses and is capable of generating the clock pulses needed to drive the store and output process functions.

FIG. 2 shows the coefficient generator system 6 in more detail. The input processor 2 is capable of synthsising picture points from information on surrounding picture points from both incoming and stored data and this will be described in more detail below.

If the coefficient system 6 is being used only for noise reduction, the input processor 2 for case of explanation can be considered as omitted and the incoming video considered to be directly applied to processor 6.

Thus considering the arrangement of FIG. 2 for providing a noise reduction system, the incoming video signal (e.g. NTSC 525 line standard T.V. signal) is applied to coefficient modifier 210. If the signal is normal composite video, the chrominance and luminance components will have been separated and the analogue information converted into digital form prior to application to the modifier 210. Such analogue to digital conversion of T.V. signals is well known.

The output of coefficient modifier 210 is received by an adder 211 which also receives a stored video signal received from store 22 via a further coefficient modifier 212. The output of the adder is entered into the store 22 having been first modified in a further modifier 213. The output of the store is thus comprised of a portion of the incoming video data to which a portion of the stored data has been added. This has the effect of reducing noise which tends to be of a random nature.

The T.V. picture can be considered as comprising a number of picture points which picture point information has been converted into digital form suitable for storage in the video store 22 typically 10–12 bits wide.

Thus the general principle of noise reduction is achieved by re-circulating the video data to which a portion of the new incoming data is added and a portion of the total removed for each store location. The system may be likened to an integrator with leakage. In a simple system the values of coefficients K11, K12 and K13 would be fixed so that effectively fixed portions of the stored and incoming data would be selected. Whilst this selection of the coefficient will surffice for a particular picture condition, such as when the entire picture content is stationary (e.g. in a T.V. test card) in practice the values of the coefficients are varied to accommodate picture movement to avoid producing smearing of the final picture for example.

A unit (not shown) selects the various coefficient values to be used in the modifiers.

This unit provides the coefficients in dependence on the degree of noise reduction required.

The set coefficient unit may also provide variation of selected coefficients by detecting any picture movement occurring between incoming and stored data.

The result of the comparison of information modifies the coefficients on a point by point basis in real time.

Coefficient modifiers 210, 211 and 212 each include a multiplier operating in real time. A method which can be used is a look-up table. The input data is applied to a RAM within each modifier which has sufficient addresses so that each input number identifies one particular location in the store. A suitable random access memory (RAM) would have a capacity of $8 \times 256$ bits for example.

The coefficients are loaded into the store locations within the RAM during a write cycle. The coefficient data is applied to the RAM data input. The location to which data is written in is determined by store address data input of the RAM. Address data is applied in the normal way to the address input to input the coefficient data. During operation as a multiplier (i.e. read cycle) the incoming video data is applied to the RAM 'address' terminals. The RAM has sufficient addresses so that each input number identifies one particular location within the store. Thus as each location has a preloaded coefficient stored therein when a particular location is accessed (i.e. in dependence on the incoming data which effectively defines the address), the data stored in a particular location is read out from the RAM. This data will either be an O or I depending on the predetermined coefficient. Thus the 8 bit input data for a particular picture point will effectively be multiplied by a coefficient K11, 12 or 13 as selected in the various modifiers.

The data store 22 has three data ports 1, 2 and 3. Port 1 allows data to be written into the store, port 2 allows data to be read from the store at a location corresponding to port 1 and port 3 allows data to be read from the store at another location. In principle the three ports run asynchronously. The data store may take the form of a system described in (U.S. patent application Ser. No. 764,148 U.S. Pat. No. 4,183,058). The store is large enough to store at least one complete television frame of Y, I and Q information at full bandwidth (5-6 M bits).

The store will have an associated store control which includes address counters for addressing the various memory addresses within the frame store for a read or write cycle and timing control for producing timing signals for addressing the memory elements at the correct point in time, in known manner and as explained in detail in the above referenced patent application. The store itself may be constructed from known $64 \times 64$ bit memory chips (i.e. 4096 by 1 bit RAM) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestore of $256 \times 512$ words 8 bits wide to allow 512 video lines each of 512 picture points to be stored.

The system output is taken from the store output so that the data passing through the system effectively experiences zero delay because the storage time together with the system processing is selected to be an integral number of fields or frames between system input and output. In the three port store system one output is used to provide the fed back information and the other output is used to provide the noise reduced data.

Figure 4:
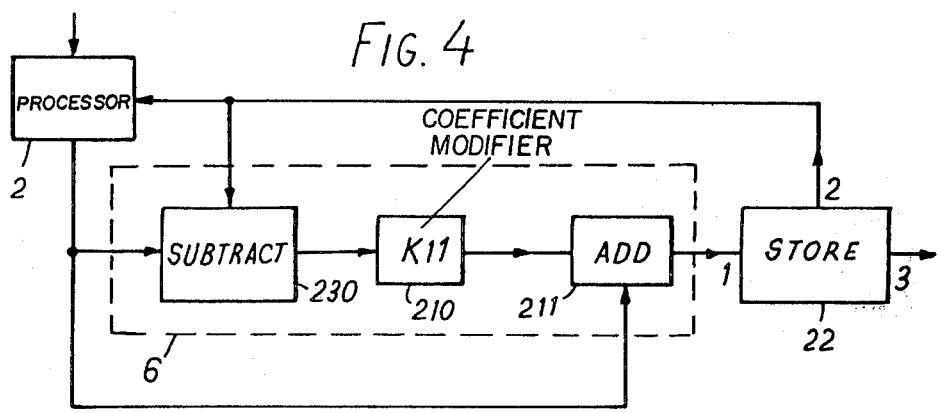
FIG. 4 shows a further alternative processor.

In the alternative systems of FIGS. 3 and 4, the three coefficient modifiers K11, 12 and 13 within the coefficient generator system 6 have been replaced only by one coefficient modifier K11. In the FIG. 3 arrangement incoming data and stored data are subtracted in subtractor 230 and this output modified by coefficient modifier 210. The modifier output is then added with the stored output before being written into the store. In the FIG. 4 arrangement the adder 211 adds the modifier output to incoming rather than stored data. In both these alternative systems it is seen that portions of incoming and stored data are added to achieve noise reduction for example, these portions being determined by selection of coefficient K11 which as previously described may be varied in dependence on any movement detected between incoming and stored picture information.

When the above systems are used for standards conversion rather than noise reduction, it is necessary to accommodate for change in field rate and to change the number of lines per frame. For European PAL the field rate of 50 field/sec and NTSC used in USA is 60 fields/sec. The reduction in the number of lines is effected by the input processor by synthesising an different number of picture points as already mentioned and the increase in field rate can be accommodated due to the asynchronous nature of the frame store which allows different write in and read out rates. A proportion of the data from the old frame is combined with a proportion of the new frame using the 'leaking' intergrator system i.e. coefficients K11, 12, 13 (or K11 alone as in FIGS. 3 and 4) to produce smooth movement (movement interpolation) at different frame rates.

In the digital standards converter it is required to modify the coefficients on a cycle basis. The effect of using a cyclic variation may be utilised to provide 'movement interpolation'. The digital standards converter requirement alters depending upon the type of scene under examination. Movement interpolation minimises distortion due to movement since standards conversion necessitates conversion from say 525 lines—60 fields per second (NTSC) to 625 lines—50 fields per second (PAL).

If an incoming picture having an incoming field rate of 60 fields per second carries a moving image, then successive pictures provide a general increment of the image moving from left to right on the screen. The outgoing pictures concerned with the outgoing fields are at 50 per second. In an ideal movement interpolator an image of the moving object provided on the outgoing picture would need to be provided in a position which is not depicted on the incoming fields.

The system of movement interpolation now described makes use of three different techniques to portray movement in the most acceptable subjective manner. The system is variable and adaptive. Techniques have been developed which enable the adaption system to be semi-automatic.

The three techniques utlised are categorised below:
(a) field sequence interchange
(b) digital persistence
(c) digital cyclic persistence variation.

The three techniques are now described.

The incoming picture field sequence may be considered to start at a known position in time with respect to the outgoing picture field sequence. As the pictures arrive seqentially the error which occurs is the outgoing picture field sequence increases over a period of twelve incoming fields and ten outgoing fields in a 60 field or 50 field converter.

The assumption has been made in the above paragraph that the two different types of field (odd field and even field) cannot be interchanged in the sequence. The resultant discontinuous movement is clearly visible to the observer.

If the field sequence is changed so that an odd field is being displayed as an even field the amplitude of the discontinuity can be reduced by a factor of two.

The input processor 2 (using adaptive volume manipulation described below) is capable of accurately changing an odd field to an even field or an even field to an odd field without introducing distortion of the fixed and moving image. In this standards conversion arrangement use is made of the adaptive volume manipulation to undertake a field sequence variation thus reducing the amplitude of the visible movement discontinuities.

An improvement to the subjective effect of movement discontinuity is provided by using digital persistence. A normal television system has a small amount of residual memory due to the effect of phosphor decay. A controlled persistence is introduced in the standards converter by utilising the frame store memory together with coefficients which control the persistence. Thus selection of the values of coefficients k11, k12 and k13 dictate what proportion of the previously stored picture is added to the new picture available from the incoming data stream before re-storing in the memory.

In the basic digital persistence system coefficients k11, k12 and k13 are fixed. Typical values are shown below:

$k11 \times 0.625$ $k12 \times 0.375$ $k13 \times 1.0$

The movement portrayal utilising digital persistence brings the subjective effect closer to the ideal. However, different viewers could choose different values for the coefficients which suits them best.

These values can be stored in a ROM accessed by the viewer (e.g. via an analog control and ADC). The ROM value selected is fed to the multiplier (RAM) within the coefficient modifier.

The effect of movement in a standards converter gives rise to a cyclic discontinuity. Major improvements to the subjective effect may be provided if the digital persistence is varied in a similar cyclic pattern. A typical cycle for k11 is shown below:

| Field | k11 |
|-------|-------|
| 1 | 0.5 |
| 2 | 0.625 |
| 3 | 0.75 |
| 4 | 0.875 |
| 5 | 1.0 |

The cycle repeats every 5 fields at the output. Once again subjective viewers may choose different values of k's to suit their own viewing requirements and provision is made to alter the value of k by a mechanism which may be available to the viewer.

Figure 5:
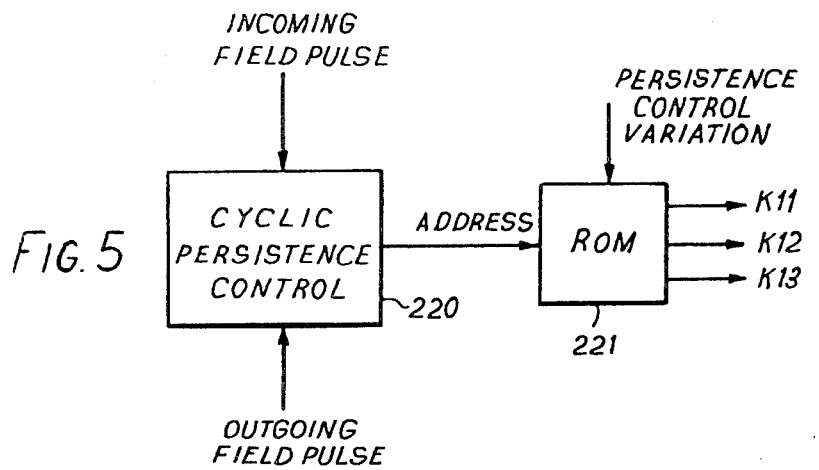
FIG. 5 shows an arrangement for cyclically selecting coefficients.

A way in which the cycle can be effected is shown in FIG. 5. A cyclic persistence control 220 incorporating address counters receives incoming field pulses and outgoing field pulses and provides an address as a result of the comparison. The address provided is used to look up k11, k12 and k13 in the read only memory (ROM) 221. The ROM has a number of coefficients stored which may be accessed by the address. In addition the ROM has an input for varying the persistence control. The persistence control variation input selects a group of coefficients stored in the ROM. If a single ROM is not large enough to accommodate all the coefficients needed a number of ROM's may be simultaneously addressed and selected by the persistence control variation input.

The synthesis of the picture points within processor 2 will now be explained with regard to volume manipulation.

The synthesis of a new picture point using volume manipulation makes use not only of the adjacent picture points in the horizontal and vertical dimension of one picture but also of information coming from the next picture or series of pictures. Volume manipulation is the subject of U.S. patent application Ser. No. 015,676.

FIG. 6 shows a $3 \times 3 \times 2$ volume manipulation matrix. In each of two successive fields (successive pictures P and Q) 9 picture points P1 to P9 and Q1 to Q9 are defined. These 18 points are those closest to the new picture point NP1 to be synthesised together with picture points some little distance away. Thus P1 to P9 are the original picture points on picture P and Q1 to Q9 are the picture points on picture Q.

The new picture point is calculated from the expression below:

$$NP1 = K1P1 + K2P2 + K3P3 + K4P4 + K5P5 + K6P6 + K7P7 + K8P8 + K9P9 + k1Q1 + k2Q2 + k3Q3 + k4Q4 + k5Q5 + k6Q6 + k7Q7 + k8Q8 + k9Q9$$

A circuit which could be used to implement the solution for NO1 is 18 separate real time multipliers feeding into an 18 input adder. Such an arrangement is shown in FIG. 7. The volume processor comprises multipliers 160 to 168 for the picture points P1 to P9 and multipliers 180 to 188 for picture points Q1 to Q9. These various multipliers can be constructed from RAMs. The multiplier outputs are connected to adder 169. Serial operation of some multipliers and adders may be utilised or a combination of serial-parallel adding and multiplication may be used. As already described the volume manipulation is used for picture point synthesis to enlarge or reduce the size of the television picture. The percentage utilised from each picture varies over the screen and depends upon the magnification or size reduction operating at any time. The values of K1 to K9 and k1 to k9 selected will vary depending upon the magnification or size reduction demanded. Utilisation of this principle produces imperceptible picture degradation over a very large picture size change, and this principle is used to produce a digital standards converter capable of changing the picture size from 525 to 625 line standards or 625 to 525 line standards.

The volume manipulation principle described above produces imperceptible degradation if the scene being viewed remains stationary or near so. Moving scenes can cause errors in the solution to the synthesised picture point. A technique for preventing degradation is to utilise 'adaptive' volume manipulation.

'Adaptive' volume manipulation reduces the proportion of picture P utilised to generate the synthesised picture point in P1. K1 to K9 are reduced to low value and k1 to k9 are increased in value under conditions when picture degradation would be caused (i.e. a greater proportion of picture Q is used).

Volume manipulation minimises the picture degradation by giving the processor access to incoming picture points which are as close as possible to the synthesised picture point being generated. The principle potential for degradation occurs when a scene changes between picture P and picture Q. Such a change may be caused by movement and generally all changes are ascribed to this cause whatever their actual source—for example noise on the signal will give a signal change which can be mistaken for picture movement. Movement detection can be determined by measuring the change which has occurred between one successive picture point and the next. A threshold level is ascribed to the difference between the two levels and movement is determined to have taken place when the threshold is exceeded in either direction and new values for the coefficents selected for example from those stored in a ROM. Use of a movement detector makes the volume processor 'adaptive' by varying the coefficient values selected in dependence on the detected movement.

The description above of adaptive volume manipulation has used 9 picture points in two successive pictures to provide a synthesis of the new picture point. An alternative case exists when only a single line of information is used in picture P and two lines of information are used in picture Q. Such a special case of volume manipulation has been used for specific applications with a consequent reduction of the circuitry needed for implementation. In this case the vertical component of NP1 is given by the equation:

$$(Vert)NP1 = k1Q1 + k4Q4 + K1P1$$

Figure 8:
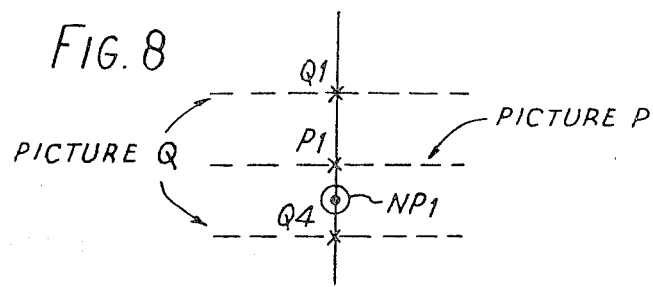
FIG. 8 shows an alternative picture synthesis method.

Values of k1, k4 and K1 are varied according to the picture size required and under the control of the movement detector. FIG. 8 shows only the computation of the vertical component of NP1.

Horizontal interpolation may be undertaken using real time multipliers. Another method of undertaking horizontal interpolation is to vary the clock frequency of the input and output to a store. In a simple example a line may be clocked into a line store at one speed and clocked out of the same store at a different speed. The effect is a horizontal expansion or contraction depending upon the relative speeds of the input and output clocks.

Figure 9:
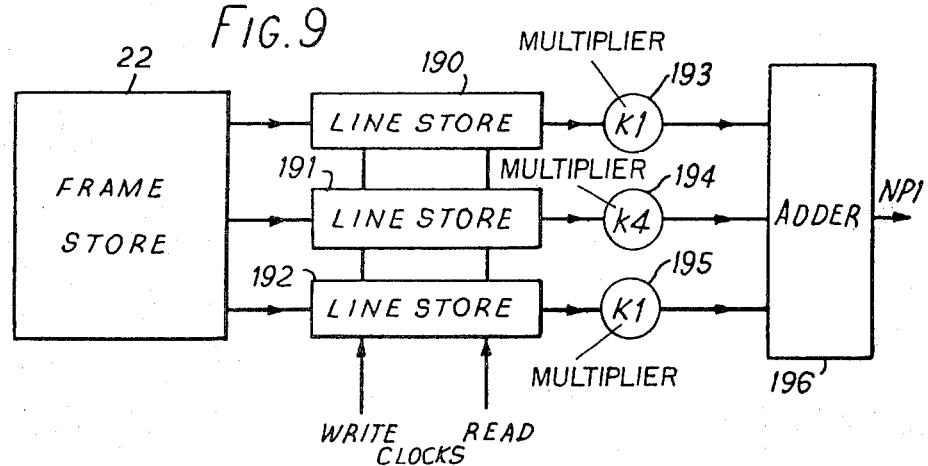
FIG. 9 shows an arrangement for effecting this alternative synthesis method.

The principle has been utilised in conjunction with the special case of volume manipulation described above to provide a specific range of expansion and contraction. FIG. 9 shows an arrangement for horizontal expansion or contraction using variable write/read clock frequencies. Picture data from frame store 22 is input to line stores 190, 191 and 192 at one input clock rate and read out at a different rate to multipliers 193, 194, 195 for coefficients k1,k4 and K1 respectively. The multiplier outputs are connected to adder 196 to produce NP1. The combination of these two special cases of FIGS. 8 and 9 reduce the requirements for circuit complexity.

Figure 10:
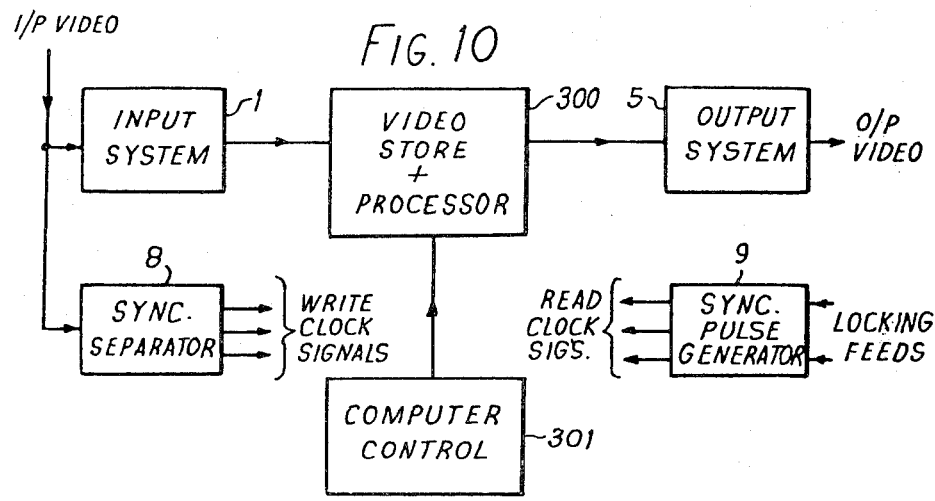
FIG. 10 shows the present system using a distributed store and processor.

In the present system now described with reference to FIG. 10 a highly optimised arrangement is provided comprising a distributed store and processor which can achieve all of the functions described above but in which the hardware arrangement is substantially different. The store and processor described form a general purpose solution to the manipulation of television signals in real time under computer control for example. This system can form a peripheral to a general purpose digital computer which is capable of operating on T.V. signals.

It is anticipated that future developments in video processing lie in the use of software which will steadily increase the scope of the processor and store system which is to be described.

The input system 1, output system 5, together with sync separator 8 and sync pulse generator 9 remain. The input processor 2, output processor 4 and noise reduction system 6 are now incorporated in the store and processor system 300 and no longer exist in explicit form. Once a signal has entered the input port of the store, the signal path it may take is determined by the nature of the distributed processor. The control for the system 300 is shown provided by computer 301 although hardware control is also possible.

The arrangement of the video store and processor will now be described.

FIG. 11 shows the basic process which is implemented within the distributed system. Input data is applied to one input terminal A1 of a write processor 310. The output from the write processor B1 is applied to the input P1 of a store 311. The output P2 from the store is applied to the second input C1 of the write processor.

Output P3 from the store is applied to terminal A2 of a read processor 312. Output P4 from the store is applied to the C2 terminal of a read processor. The output data from the read processor appears on terminal B2.

During a write cycle the write processor together with the terminals P1 and P2 of the store are active. The store is controlled to provide a cycle called 'Read Modify Write'. This is a standard store cycle which is provided by 16K RAM MOS store integrated circuits.

The write processor undertakes the mathematical expression below:

$$B1 = K1A1 + K2C1 + K3$$

Constants K1,K2 and K3 are set by a write coefficients store and selector system.

During the read process store, connections P3 and P4 together with the read processor are active. P3 and P4 have access to any picture point within the store. An address system identifies the picture point which will be used. The read processor undertakes a mathematical expression below:

$$B2 = K4A2 + K5C2 + K6.$$

Coefficients K4, K5 and K6 are set by a read coefficients selector system.

The read process and the write process may occur asynchronously. The access of P1, P2, P3 and P4 may be any point within the picture.

Utilising the processor function described above it is possible to adjust the coefficients K1 through K6 to undertake all of the functions which have been described in the earlier systems including noise reduction, picture expansion, picture compression, picture enhancement, picture shifting. The computer is used to address the store and to set the coefficients which are to be used. A suitably designed computer programme allows this operation to be undertaken. No restriction is placed by the system upon clock speed at the input relative to the output.

In the description of the basic process shown in FIG. 11 it is clear that the write process occurs at a different time from the read process. It is possible therefore to combine the write processor and the read processor into one function without sacrificing speed. The system shown in FIG. 12 is the minimum system capable of undertaking the processes needed to implement all of the functions described. A single processor 320 is multiplexed with digital switches to act first of all during the write cycle—Read Modify Write—and then during the read cycle. The processor undertakes a mathematical function below:

$$B = K1A + K2B.$$

In practice a large number of the functions may be undertaken utilising a special value for K1 equal to 1 minus K2.

Digital switches 321, 322 and 323 are provided to select the data paths. During the write cycle the input video is connected to terminal A of the processor. Terminal B is connected to input P1 of the MOS store, 311. Terminal P2 of the MOS store is connected to the terminal C of the processor.

During a read cycle the terminal P3 is connected to processor terminal A. Terminal P4 is connected to terminal C of the processor. The output video is taken from terminal B of the processor. The coefficients K1 and K2 are altered according to whether a read cycle or a write cycle has been selected. The digital switches 321, 322 and 323 at terminals A, B and C respectively may be logical gates or tristate switches in practice. The MOS store need only have one input and one output together with a method of routing the data to the required terminals A and C of the processor.

Figure 13:
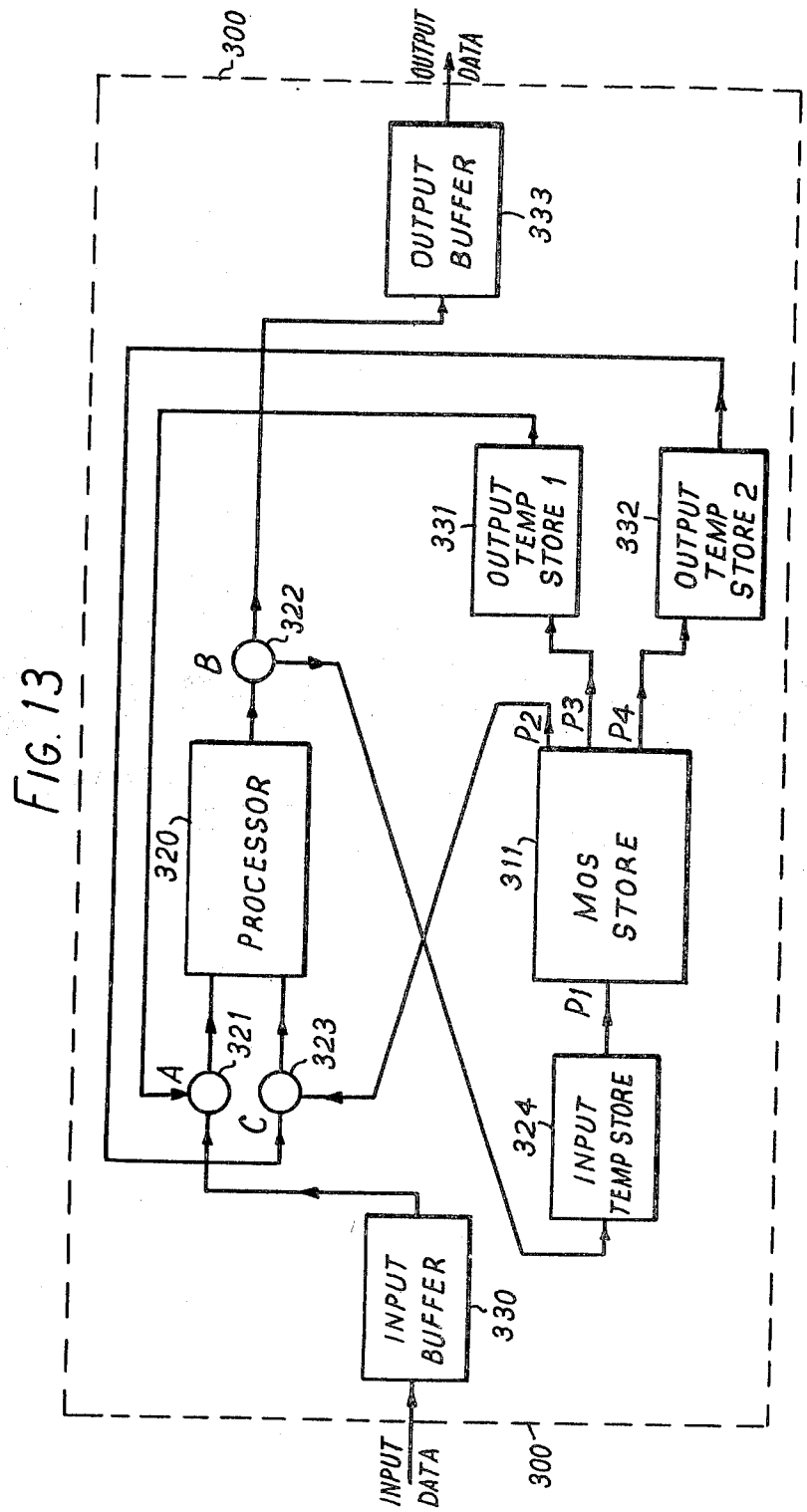
FIG. 13 shows a practical arrangement for the distributed store and processor.

A practical arrangement of the distributed store and processor is shown on FIG. 13. Input video is stored in the input buffer 330. The input buffer typically has a capacity of 16 words each of which is 10 or 12 bits long. The processor 320 is connected to the various sources and supplies of data signals by tristate switches 321, 322 and 323. Users of logic circuits will be aware that tristate switches do not include an explicit switch function.

The processor has a capacity for multiplying 12 bit digital words by 4 bit digital words. The output from the processor is stored in a temporary store 324. The MOS store takes the form of standard 16K integrated circuits which are random access memory (RAM) devices. Output ports P2, P3 and P4 do not explicity exist but are used to illustrate the use of the various parts of the circuit. During a write cycle the output from the MOS store is conncted to terminal C of the processor.

During a read cycle the output from the MOS store is applied first to a temporary store 331 and then to a second temporary store 332. During a read cycle the contents of temporary stores 331 and 332 are applied to the terminals A and C of the processor function. The output from the processor function at terminal B is connected via tristate logic to the output buffer 333. The output buffer is a store which will typically store 16 words 10 or 12 bits long.

Figure 14:
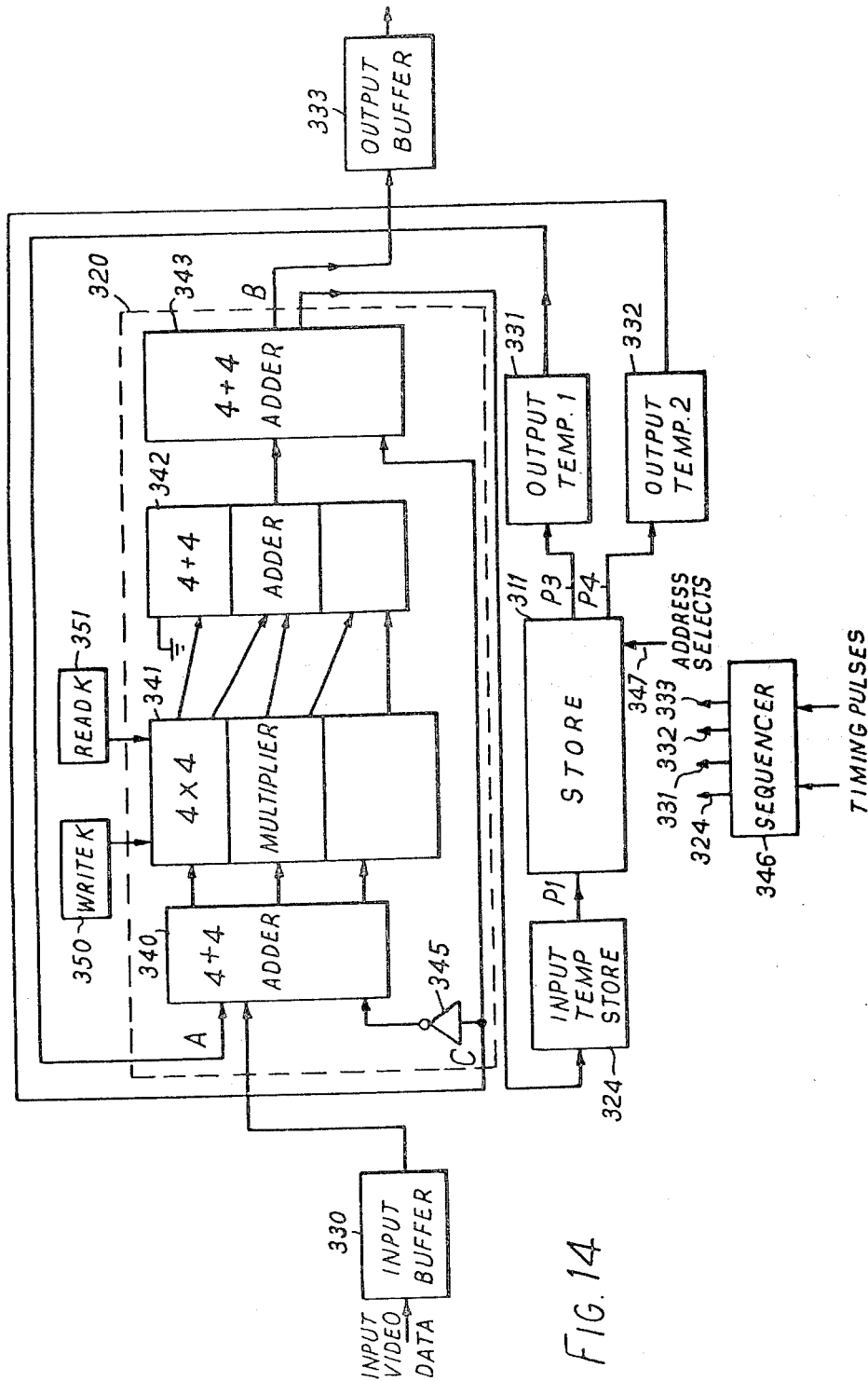
FIG. 14 shows the arrangement of the processor and store in more detail.

FIG. 14 shows the store and processor arrangement in more detail. The arrangement now described would be 1 of 16 identical circuits required to provide the necessary capacity (i.e. FIG. 14 can be provided on 1 card, a total of 16 such cards being required).

The input buffer 330 can comprise 3 integrated circuit chips type 74LS670 to provide the necessary bit handling.

The buffer output goes to the input A of adder 340 of processor 320. The adder is constructed from 3 chips each of 4×4 bits (e.g. type 74LS283). The input A is also connectible with the output of temporary store 331. Input C of the processor is connected to the other input of adder 340 via inverters 345 (e.g. type 7404). The output from adder 340 is received by the 'Wallace Tree' multiplier arrangement comprising multiplier block 341 and adder 342. Block 341 comprises three 4×4 multipliers (e.g. 74S274) which have outputs connected in Wallace Tree configuration to the adder 342 comprising three 4+4 bit adders as above. The output from the block 342 is connected to adder 343 which again comprises three 4+4 bit adders. The other input to the adder is from C. The adder output is processor output B which passes either to output buffer 333 (3×74LS670) or to the input temporary store 324 (4×74LS174). The store 311 is constructed from 22 chips sharing common addressing 347. The input to each chip is received from a specific location in the temporary store 324. The output from each chip of the store is accessible via the temporary stores 331, 332. Each of the 22 chips of the store is a 16K RAM (e.g. MK4116). Addressing, writing and reading data into and out from such an integrated circuit RAM is well known. The temporary output store 331 has its output available to terminal A of the processor and output store 332 has its output available to terminal C of the processor.

Storage of coefficients for the multiplier during a write cycle is undertaken by block 350 (e.g. 825184) and during a read cycle by block 351 (e.g. 74LS670). The coefficient stores 350, 351 store several values of K which may be selected by the computer control and the system control. Sequencer block 346 (e.g. 74LS138) provides sequencing for the various temporary stores and buffers during the operation cycle under control of the timing pulses produced externally to the store. The way in which the computer can be interfaced and gain access to the addressing and control circuits of the video store has been previously described in the video processing system described in U.S. Pat. No. 4,148,070.

The general processor function produced by the FIG. 14 arrangement is shown in FIG. 15. First adding function is effected by 340, 345, then multiplication by the coefficients K by 341, 342 and the final adding function by 343.

Figure 16:
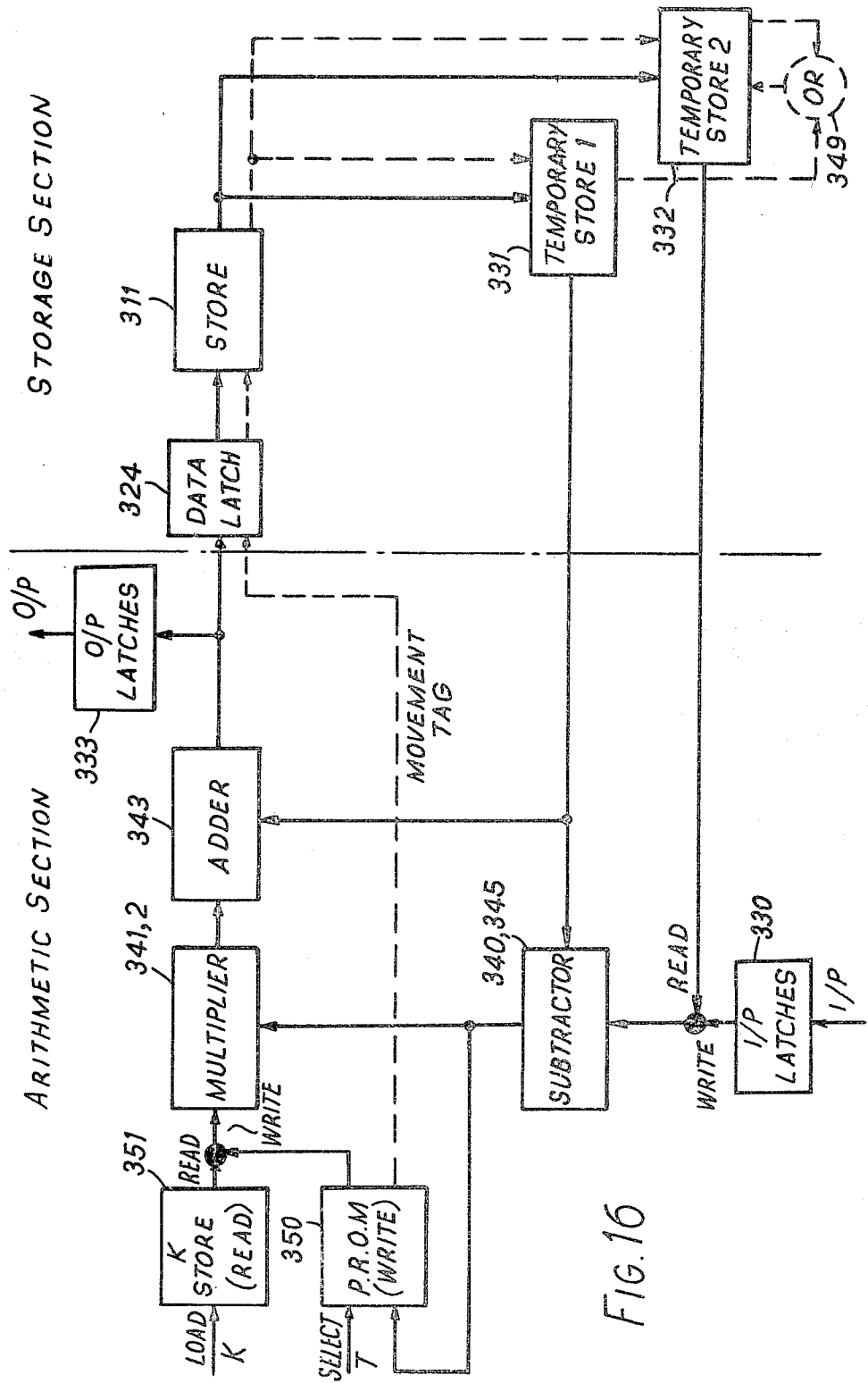
FIG. 16 shows an expanded system to FIG. 14.

A modified version of the FIG. 14 arrangement is shown in FIG. 16. This again may be one of 16 cards forming the total distributed store and real time processor. In this arrangement a movement tag is generated which accompanies the data through storage which allows more control of the processing function. The movement tag may be stored as the least significant bit of a data word which includes the picture point data.

Data input and output to the system is in the form of 8 bit words (although provision is made for a further 2 bits). The arithmetic within the store board is done to 10 bit accuracy, thus avoiding rounding errors.

In dependence on whether write or read cycles are being handled one input to the subtractor will come from input latch 330 or temporary store 2. Similarly the value of the coefficient K applied to the multiplier will be received from PROM 350 or store 351 dependent on write or read.

Tri-state switching is used to make both these changes.

All the hardware on the right hand side of FIG. 16 viz data latch 324, store 311, temporary stores 331, 332 and OR 349, is in practice duplicated, thus doubling the storage capacity of the board; the two sections of this part of the circuit are designated stripe 1 and stripe 2. In other words, the two stripes share one arithmetic manipulation circuit including subtractor, multiplier and adder.

Figure 17:
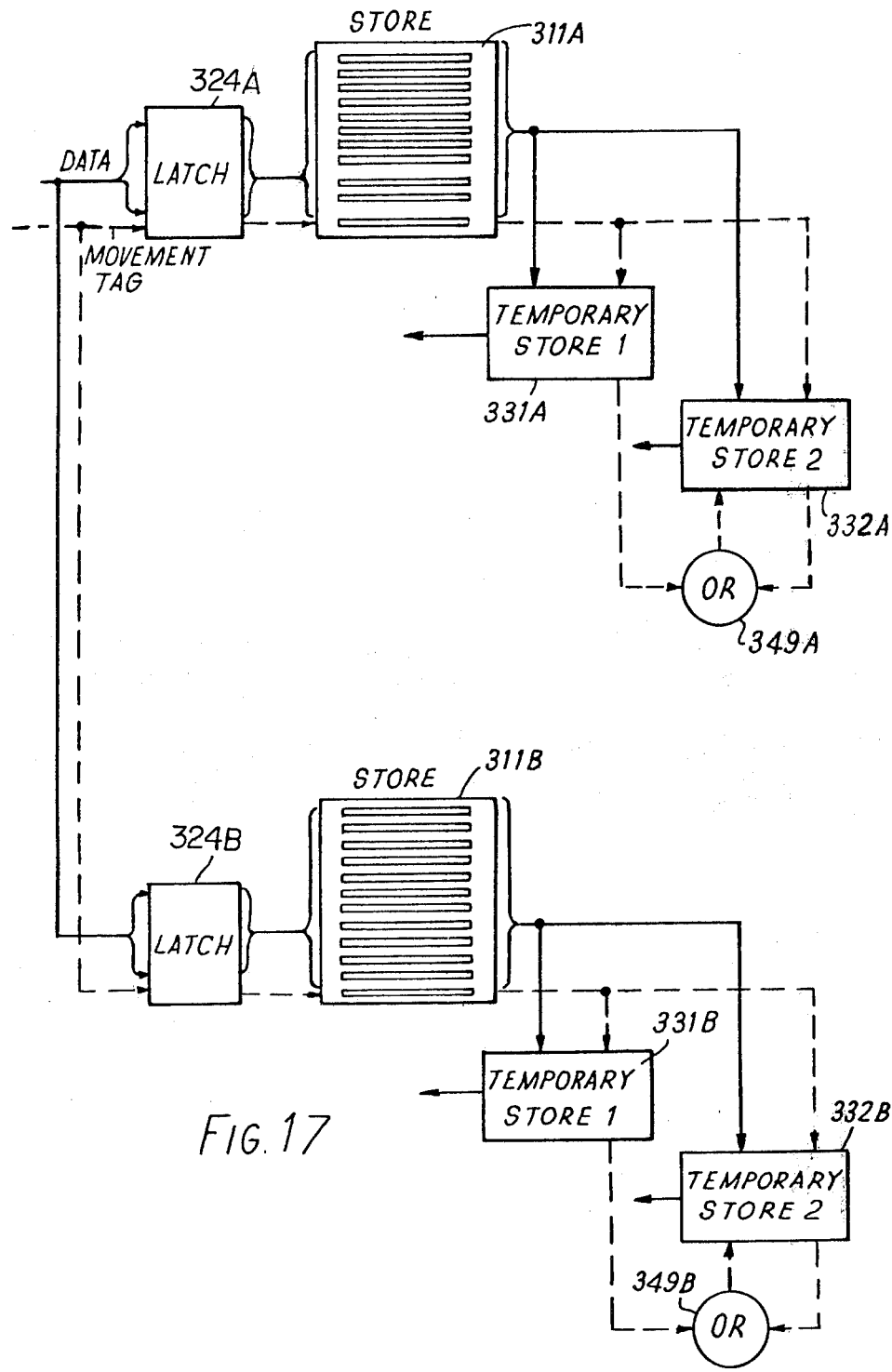
FIG. 17 shows the duplicated storage arrangements of FIG. 16.

The duplication of the right hand side of the board of FIG. 16 is shown in FIG. 17. For stripe 1 the 10 bit data is held by latch 324A together with the 1 bit movement tag from PROM 350. The 11 bits of data are written into store 311A which comprises 11 RAM chips. Data read from store 324A is held in temporary stores 331A, 332A and the movement tag compared in OR 349A (e.g. type 7432 and associated flip flop 74LS74). Output data (10 bit) from the temporary store 331A is available for use by the subtractor and adder of the arithmetic section and the output data from temporary store 332A is available for use by the subtractor when required.

During the handling of data for stripe 2, the data is handled by 324B, 311B, 331B, 332B and 349B in a similar manner.

Returning to FIG. 16, the operation during a write cycle will be considered. Although not shown in FIG. 16 the input data latches 330 are capable of storing two data words, one each for stripes 1 and 2.

A write cycle actually consists of a read-modify-write cycle. Considering for the moment only one stripe, a data word is read from the store 311 into temporary store 1 which picture point data corresponds in position on the picture with a data word available in the input latches, and thus represents the value of that picture point from one frame ago.

The difference between the new data word and that from one frame ago is then calculated in the subtractor. The value of K to be used in the multiplier depends on the PROM output. This output is governed by the instruction word T which instruction as previously described in operating PROMs can select values of K already stored therein. This instruction word can be generated via the computer or alternatively can be controlled by an analog control having its output connected to a ADC which produces the instruction word. The coefficient produced by the PROM can also be selected in dependence on the subtractor output so that the selected value determined by T is modified in dependence on the difference determined by the subtractor.

In addition a threshold level previously programmed into the PROM provides the movement tag which tag is set to logic 1 if the subtractor output exceeds the predetermined threshold.

The multiplier output is then added to the previously stored data word in the adder 343 and the new data is written into the store (together with the movement tag) via the data latch 324. As in practice there are two stripes, the reading of the store, to allow the arithmetic operation to be effected, actually produces two data words one in each of the sections of temporary store 1, and thus the arithmetic section process actually occurs twice for the one store read operation, the arithmetic section operating consecutively on these two data words and the two words held in the input latches to produce two new data words which are written into store 311 via data latches 324.

The instruction word T is thus seen to control the filtering action of the write process, by determining the value of K used. Considering FIG. 18 which represents the data processing operations of the system of FIG. 16, when considering the above write operation it can be seen that a value of zero for K would simply cause the previous data word to be rewritten into the store without modification, whereas a value of one would cause the new (input) data words to be written in without modification. Intermediate values selected for K cause varying amounts of filtering so as to effect noise reduction or temporal filtering associated with standards conversion for digital persistance. Typical values for K for use with the present system range from 1/16 to 15/16. Thus noise reduction and the temporal filtering aspects of standards conversion are effected on a write cycle.

By contrast, spatial filtering, that is the interpolation required in zooming and standards conversion, is effected on a read cycle. Consider the problem of forming a new line in between the stored lines, as shown in FIG. 19; specifically, we need to calculate a picture point at R. The picture point R is shown on a synthesised line which is effectively located at a position between the lines on which A and B are situated which lines are existing lines in fixed positions. B is on a line from an alternate interlaced field to A; point C is on the next existing line in the field which contains A.

On static areas of picture (i.e. with no picture movement) R is calculated from the two closest lines i.e.

$$R = (1-x)A + xB$$

However, A and B refer to lines of pictures taken at two different times (because they are on opposite fields). Thus, if there is any movement, R is calculated from the two closest lines of the same field, i.e.

$$R = (1-y)A + yC$$

A read cycle, then, consists of three reads. Considering again only one stripe, data word A and its movement tag is read from store into temporary store 1, and data word B and its movement tag is read from store into temporary store 2. The two movement tags are then examined, and if either of them (or both) are high (logic 1), then in the third read cycle, data word C replaces B in temporary store 2. The arithmetic process then proceeds, operating on the contents of temporary stores 1 and 2, and using one of two K values (x or y) from the K store depending on whether the temporary stores contain A and B or A and C, and results in an output R which is loaded into the output latches.

It will be apparent that the values of K (i.e. x and y) vary with vertical position of the required line relative to the input lines (which are fixed), and are therefore solely dependent on the read line number (vertical address). The necessary values of K are therefore calculated in the address generating circuitry and loaded into the K store.

In practice, because there are two stripes, the reading of the store results in two pairs of data words, and the arithmetic process proceeds on these one after the other, producing two outputs to the output latches 333 which are capable of handling both words. In a read cycle where interpolation is not required as for example when the processing system is being used solely for noise reduction, the operation is somewhat different as the stored data on a read cycle will require no further manipulation but nevertheless the data passes from the store through the arithmetic section to the output latches 333. In such a read cycle the data comes from the store into temporary stores 1 and 2 and any difference is subtracted in the subtractor as before. The output passes to the multiplier which in this situation has its coefficient selected to be zero so effectively the multiplier output is zero and thus the adder output comprises only the data read from temporary store 1. The data is passed to the system output via latches 333. Thus although the output data corresponds to the data from temporary store 1 it is convenient to pass this through the arithmetic section to the system output.

In the distributed arrangement described in relation to FIGS. 14 and 16 in which 16 similar cards are provided each with a storage and arithmetic section it is seen that by providing a plurality of arithmetic units operating in parallel, the overall speed at which processing is effected is considerably increased. The operating speed of each arithmetic unit is such that it can process both stripes 1 and 2 for each store cycle.

We claim:

1. A distributed video frame store and real time processing system for manipulating picture point data comprising, a video frame store for storing the picture point data from a TV picture frame comprising several hundred mutually different lines of video information representing different areas of the frame, said store being subdivided into a plurality of sectors each storing different lines of the video frame and capable of parallel operation;

processing means comprising a plurality of discrete arithmetic units capable of parallel operation, each arithmetic unit being only associated with one of said sectors and having input means connected to receive data from the associated one of said sectors for processing picture point data from that particular sector of the store; and means to control said processing means to process a different picture point in each of the sectors of the store simultaneously and produce a different processed output from each sector.

2. A system according to claim 1, wherein the arithmetic units of said processing means are adapted to operate as an input processor, each having a first input connected to receive data from a respective sector output of said store, and each having a second input connected to receive incoming picture point data and each having an output connected to provide processed data at a respective sector input to said store so as to effect processing of the incoming and previously stored picture data for each respective sector of the store simultaneously during an input processing operation.

3. A system according to claim 1, wherein the arithmetic units of said processing means are adapted to operate as an output processor each having a first input and a second input connected to receive data from a respective sector output of said store so as to effect processing of previously stored picture data from at least two locations within each store sector simultaneously during an output processing operation.

4. A system according to claim 3, wherein each store sector includes a plurality of storage devices each for receiving and storing at least one bit of each incoming data word and wherein first and second temporary stores are provided each connected to receive the output of one or more of the storage devices of the store sector for temporarily holding one data word read out from the store sector for processing by the arithmetic unit of the output processor for that sector.

5. A system according to claim 1, wherein the arithmetic units of said processing means are adapted to operate as an input processor each having a first input connected to receive data from a respective sector output of the store, and each having a second input connected to receive incoming picture point data, and each having an output connected to provide processed data at an input of the store so as to effect processing of the incoming and previously stored picture data for each respective sector of the store simultaneously during an input processing operation and said processing means also being adapted to operate as an output processor, each unit having said first input and said second input connected to receive data from a respective sector output of said store so as to effect processing of previously stored picture data from at least two locations within each store sector simultaneously during an output processing operation, and including switching means connected to each arithmetic unit and store sector for switching the processing means between the store sector input and the store sector output.

6. A system according to claim 1, wherein each of the plurality of sectors of the frame store are subdivided into two subsectors sharing a common arithmetic unit.

7. A system according to claim 1, wherein each arithmetic unit comprises a subtractor, a multiplier and an adder, said subtractor having an output connected to said multiplier and the multiplier output being connected to the adder.

8. A system according to claim 7, including switching means, a first temporary store, and a second temporary store associated with each sector and wherein the subtractor includes a first input for receiving an output from the first temporary store connected to an output of the frame store and a second input for selectively receiving via the switching means either incoming data or data from the second temporary store connected to an output of the frame store, and said adder having one input for receiving the multiplier output and a second input for receiving the data from the first temporary store.

9. A system according to claim 8, wherein coefficient selector means are provided for selecting coefficient values for the multiplier, said selector means being connected between said subtractor and said multiplier and capable of varying the selected coefficient in dependence on any difference between incoming and stored data as measured by the subtractor.

10. A system according to claim 9, wherein the coefficient selector means includes a tag generator connected to receive the output of said subtractor for providing a movement tag indicative of any difference between incoming and previously stored data.

11. A system according to claim 10, wherein the coefficient selector means comprises a programmable read only memory connected to receive the output of said subtractor which memory is accessed to select the desired coefficient and movement tag in dependence on the subtractor output.

12. A system according to claim 11, wherein the coefficient selector means includes a second coefficient store connected to provide an input to said multiplier for providing further coefficients for use when processed data has been read from the video store.

13. A system according to claim 11, wherein the frame store is adapted to receive video data comprising a frame of data from two interlaced fields and wherein a tag detector is provided at an output of the store to control whether the data held in the first and second temporary stores is from the same or alternate fields of the frame.

14. A system according to claim 1, wherein input latches are provided at an input to each arithmetic unit to hold incoming data for processing, output latches are provided at an output of each arithmetic unit to hold processed data for outputting from the system and data latches are provided at an output of each arithmetic unit for temporarily holding data to be inputted to the video store.

15. The system as claimed in claim 1, wherein said video frame store comprises means for storing the picture point data for each picture point at a location having an uniquely assigned address and wherein said plurality of sectors respectively store different ones of said picture point locations; and wherein each one of said arithmetic units is associated with a unique one of said sectors and processes data from locations in the associated sector.

16. A method of processing video data in real time comprising:
storing a TV picture frame of video picture point data lines subdivided for storage in a number of sectors each storing mutually different lines of the frame representing different areas of the picture, and
arithmetically processing data representing a plurality of different picture points by selecting at least one picture point from each of the respective different sectors of the stored data, and arithmetically processing these selected picture points simultaneously to produce a different processed output from each sector.

17. A method according to claim 16, wherein the arithmetic processing step for each sector comprises subtracting incoming data and previously stored data and multiplying the data produced by the subtraction step by a selected coefficent, and adding the data produced by the multiplying step with the data previously stored.

18. A method according to claim 17, including selecting the coefficient in dependence on any difference measured in the subtraction step.

19. A method according to claim 18, including providing a movement code to accompany the stored data indicative of any difference measured in the subtraction step.

20. A method according to claim 19, including the further step of processing the data following the storing step by reading out data from two stored locations and subtracting the data read from these locations, multiplying the data produced by the subtraction step by a coefficient and adding the data produced by the multiplying step with data from one of the stored locations.

21. A method according to claim 20, wherein the stored data is from a frame comprising two interlaced fields and wherein the read out data for any two locations is selected to be from the same or alternate fields in dependence on the accompanying movement code.

22. The method as claimed in claim 16, wherein said step of storing a frame of video data comprises storing each picture point at a location having a uniquely assigned address with said sectors respectively storing different picture point locations; and wherein said step of arithmetically processing the data includes the step of selecting for processing different picture point data respectively taken from different locations in the sectors and simultaneously processing the selected data.

* * * * *